(12) United States Patent
Morimura

(10) Patent No.: US 11,602,811 B2
(45) Date of Patent: Mar. 14, 2023

(54) MACHINE TOOL

(71) Applicant: OKUMA Corporation, Aichi (JP)

(72) Inventor: Shoichi Morimura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 121 days.

(21) Appl. No.: 17/154,504

(22) Filed: Jan. 21, 2021

(65) Prior Publication Data

US 2021/0229226 A1    Jul. 29, 2021

(51) Int. Cl.
| | | |
|---|---|---|
| B23Q 7/00 | (2006.01) | |
| B23Q 1/01 | (2006.01) | |
| B23Q 1/44 | (2006.01) | |
| B23Q 7/04 | (2006.01) | |
| B25J 9/06 | (2006.01) | |

(52) U.S. Cl.
CPC ............... B23Q 1/01 (2013.01); B23Q 1/44 (2013.01); B23Q 7/043 (2013.01); *B23Q 7/046* (2013.01); *B25J 9/06* (2013.01)

(58) Field of Classification Search
CPC ... B23Q 1/76; B23Q 1/01; B23Q 1/44; B23Q 1/4885; B23Q 1/5412; B23Q 7/04; B23Q 7/043; B23Q 7/047; B23Q 11/005; B23Q 11/0891; B23Q 11/10; B23Q 16/10; B23Q 17/006; B23Q 17/0985; B23Q 17/20; B23Q 17/2409; B23Q 2230/006; B23Q 2707/003; B23Q 2717/003; B25J 9/0096; B25J 11/005; B25J 17/02

See application file for complete search history.

(56) References Cited

U.S. PATENT DOCUMENTS

| | | | | |
|---|---|---|---|---|
| 4,458,566 A | * | 7/1984 | Tajima | B25J 9/04 414/735 |
| 4,869,813 A | * | 9/1989 | Bailey | B23Q 17/24 700/223 |
| 5,312,220 A | * | 5/1994 | Torii | B23Q 7/048 901/18 |
| 7,503,244 B2 | * | 3/2009 | Nakamura | B23Q 1/015 82/149 |
| 8,534,169 B2 | * | 9/2013 | Miyamoto | B23Q 1/76 82/1.11 |

(Continued)

FOREIGN PATENT DOCUMENTS

| | | | | |
|---|---|---|---|---|
| DE | 102011082839 A1 | * | 3/2013 | B23Q 1/012 |
| JP | 60150940 A | * | 8/1985 | B23Q 7/165 |

(Continued)

*Primary Examiner* — Nicole N Ramos
(74) *Attorney, Agent, or Firm* — Cantor Colburn LLP

(57) ABSTRACT

A machine tool includes a headstock that holds a workpiece, a tool post that is movable in a first axis direction parallel to a workpiece rotation axis and in a second axis direction orthogonal to the first axis and holds a tool, an in-machine robot, an opening for communicating the inside and the outside of a working chamber, and a door that opens and closes the opening. The robot includes a root joint fixed in the working chamber and a link unit positioned on a distal end side of the root joint. The root joint is a linear-motion joint extendable in a direction orthogonal to the workpiece rotation axis, and is a linear-motion joint extendable between the length for causing the entire link unit to be positioned inside the working chamber and the length for causing the entire link unit to be positioned outside the working chamber.

7 Claims, 15 Drawing Sheets

(56) References Cited

U.S. PATENT DOCUMENTS

| | | | |
|---|---|---|---|
| 2008/0181759 A1* | 7/2008 | Gaegauf | B23Q 1/606 |
| | | | 414/751.1 |
| 2010/0061830 A1 | 3/2010 | Kitayama et al. | |
| 2010/0307413 A1* | 12/2010 | Mitsui | B05B 5/1625 |
| | | | 901/43 |
| 2013/0343840 A1* | 12/2013 | Fujii | B65G 49/00 |
| | | | 414/217 |
| 2016/0346888 A1* | 12/2016 | Huber | B23Q 39/024 |
| 2017/0297205 A1* | 10/2017 | Takase | B25J 13/02 |
| 2017/0326700 A1* | 11/2017 | Morimura | B23Q 17/2409 |
| 2017/0326701 A1* | 11/2017 | Morimura | B23Q 7/04 |
| 2017/0341196 A1* | 11/2017 | Nakamura | B25J 19/0025 |
| 2018/0126567 A1* | 5/2018 | Morimura | B23Q 17/09 |
| 2018/0141174 A1* | 5/2018 | Mori | B23K 26/342 |
| 2018/0250809 A1* | 9/2018 | Morimura | B25J 17/00 |
| 2019/0168380 A1 | 6/2019 | Morimura | |
| 2020/0189056 A1* | 6/2020 | Tazuke | B23Q 3/1554 |

FOREIGN PATENT DOCUMENTS

| | | | |
|---|---|---|---|
| JP | 2010064158 A | 3/2010 | |
| JP | 2019098479 A | 6/2019 | |

* cited by examiner

MACHINE TOOL

CROSS REFERENCE TO RELATED APPLICATION

The present invention claims priority under 35 U.S.C. § 119 to Japanese Patent Application No. 2020-009516 filed on Jan. 23, 2020, the entire content of which is incorporated herein by reference.

TECHNICAL FIELD

The present specification relates to a machine tool including a headstock for holding a workpiece so as to be rotatable around a workpiece rotation axis parallel to a horizontal direction and a tool post for holding a tool.

BACKGROUND

In recent years, the demand for automation of machine tools is increasing. To meet this demand, the use of robots has conventionally been proposed. For example, Patent Document 1 discloses a machining device in which a pallet being a place for supplying and discharging workpieces is provided on a side of a machine tool. Further, Patent Document 1 discloses a gantry rail arranged above the machine tool and the pallet, and an articulated robot running along the gantry rail. The articulated robot can be used to convey workpieces between the pallet and the inside of the machine tool. Further, Patent Document 2 discloses a machine tool; specifically, a technique in which a robot is arranged in a working chamber of a horizontal lathe and the robot is used to perform a machining assist work, a workpiece conveyance work, or the like. In Patent Document 2, the robot has a basic joint rotatable around an axis parallel to a workpiece rotation axis of a headstock and three parallel joints rotatable around an axis orthogonal to a rotation axis of the basic joint.

CITATION LIST

Patent Literature

Patent Document 1: JP 2010-064158 A
Patent Document 2: JP 2019-098479 A

However, according to the technique of Patent Document 1, since it is necessary to provide the gantry rail extending in such a way as to straddle the machine tool and the pallet, the overall size of the machining device is larger and further the cost is higher. Further, in Patent Document 1, the robot is used only for conveying workpieces, and the robot is not supposed to be used for machining assist work, machining information acquisition work, or the like in its working chamber.

Further, compared to the technique of Patent Document 1, the technique of Patent Document 2 is advantageous in that the entire machine tool including the robot can be configured to be relatively compact. However, the technique of Patent Document 2 has room for further improvement in order to convey workpieces between a workpiece stocker provided on the outside of the working chamber and the headstock. That is, in the case of the robot disclosed in Patent Document 2, an axial direction of a workpiece held by the robot is constantly parallel to the horizontal direction. Therefore, the workpiece is mounted on the workpiece stocker in landscape posture; i.e., in a horizontal posture in which the axial direction thereof is parallel to the horizontal direction. In the case of landscape posture, compared to portrait posture; i.e., a vertical posture in which the axial direction of the workpiece is a vertical direction, the number of workpieces mountable on the workpiece stocker is limited. Therefore, in Patent Document 2, in order to enable automatic exchange of numerous workpieces, it is necessary to provide a certain kind of driving unit capable of driving workpieces in the periphery of the workpiece stocker. As a result, even in Patent Document 2, the problem of cost increase remains.

In view of the foregoing, the present specification discloses a machine tool having a robot capable of performing various types of work inside and outside the working chamber while suppressing the cost.

SUMMARY

A machine tool disclosed in the present specification includes a headstock that is arranged in a working chamber and holds a workpiece so as to be rotatable around a workpiece rotation axis parallel to a horizontal direction, a tool post that is arranged in the working chamber in such a way as to be movable in a first axial direction parallel to the workpiece rotation axis and in a second axial direction orthogonal to the first axis, and holds a tool, a robot that is arranged in the working chamber, a cover that surrounds the working chamber, an opening of the cover for communicating the inside and the outside of the working chamber, and a door that opens and closes the opening. The robot includes a root joint fixed in the working chamber, and a link unit positioned on a distal end side of the root joint and having multiple links that are articulated with each other. The root joint is a linear-motion joint that is extendable in a direction orthogonal to the workpiece rotation axis, and is a linear-motion joint that is extendable between a length for causing the entire link unit to be positioned inside the working chamber and a length for causing the entire link unit to be positioned outside the working chamber.

In this case, each of the multiple links may be rotatable around an axis parallel to an extension/contraction direction of the root joint.

Further, the link unit includes a first link connected to the root joint, a second link connected to the first link via a second joint, a third link connected to the second link via a third joint, and an end effector connected to the third link via a fourth joint. Each of the second joint, the third joint, and the fourth joint may be a rotary joint that rotates around an axis parallel to the extension/contraction direction of the root joint.

Further, the second axis may be inclined at angle θ with respect to a horizontal plane, so as to advance downward as it approaches the rotation axis, and an angle formed between the extension/contraction direction of the root joint and the second axis may be smaller than θ/2. In this case, the extension/contraction direction of the root joint may be a direction parallel to the second axis.

Further, the machine tool may be a horizontal lathe, or may be a cylindrical grinding machine.

According to the machine tool disclosed in the present specification, extending and contracting the root joint of the robot can move the link unit to the inside and the outside of the working chamber. This enables the robot to perform various types of work inside and outside the working chamber while suppressing cost.

BRIEF DESCRIPTION OF DRAWINGS

Embodiment(s) of the present disclosure will be described based on the following figures, wherein.

DESCRIPTION OF EMBODIMENTS

Figure 1:
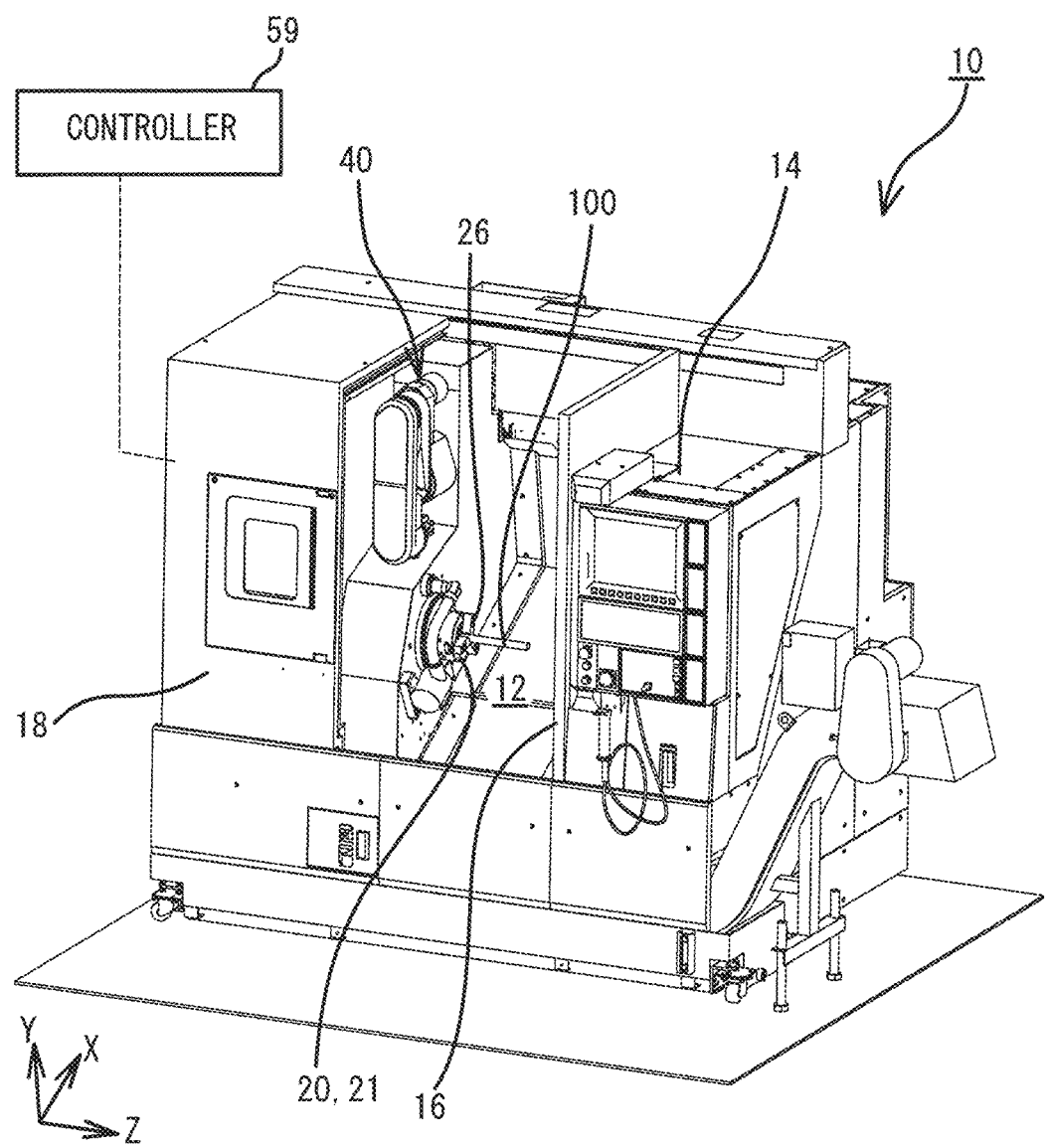
FIG. 1 is a perspective diagram illustrating a machine tool.
Figure 2:
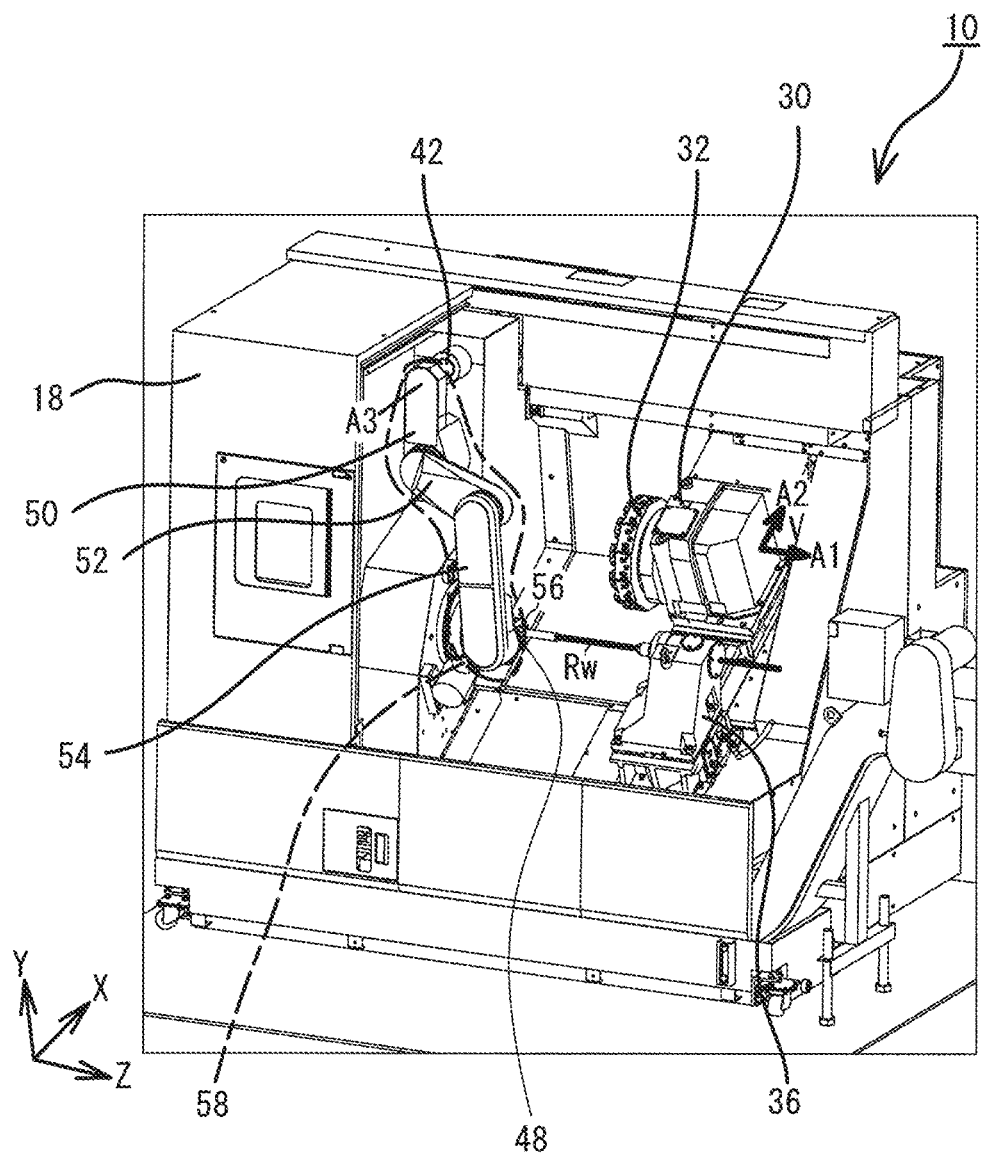
FIG. 2 is a perspective diagram illustrating the machine tool in a state where a part of a cover is removed.

Hereinafter, a machine tool 10 will be described with reference to attached drawings. FIG. 1 is a perspective diagram illustrating the machine tool 10. FIG. 2 is a perspective diagram illustrating the machine tool 10 in which a part of a cover 14 is not illustrated. In the following description, a Z axis represents the direction parallel to a rotation axis of a headstock 20, an X axis represents the direction parallel to the direction of movement orthogonal to the Z axis of a tool post 30, and a Y axis represents the direction orthogonal to both the X axis and the Z axis. Further, on the Z axis, the direction from the headstock 20 to a tailstock 36 is the positive direction. On the X axis, the direction from a workpiece rotation axis Rw to the tool post 30 is the positive direction. On the Y axis, the upward direction from the headstock 20 is the positive direction.

The machine tool 10 is a horizontal lathe having the headstock 20 that holds a workpiece 100 so as to be rotatable around a horizontal axis. More specifically, the machine tool 10 of the present example is a turning center having a turret 32 that holds multiple kinds of tools 110.

The circumference of a working chamber 12 of the machine tool 10 is covered with the cover 14. A large opening 16 is formed on the front surface of the working chamber 12, and the opening 16 can be opened and closed by a door 18. In this example, the door 18 is a slide door that is slidable in the right-and-left direction to open and close the opening 16. Needless to say, the door 18 may be a door of another form, such as a hinged door or a folding type door, instead of the slide door. An operator accesses each portion in the working chamber 12 via the opening 16. During machining, the door 18 provided at the opening 16 is closed. This is to ensure safety and environmental friendliness.

The machine tool 10 includes the headstock 20 that holds one end of the workpiece 100 so as to be rotatable, the tool post 30 that holds a tool, and the tailstock 36 that supports the other end of the workpiece 100. The headstock 20 has a motor (not illustrated) serving as a driving source. A chuck 26 for detachably holding the workpiece 100 is provided on an end surface (a spindle end 21) of the headstock 20. When the motor is driven, the workpiece 100 rotates together with the chuck 26 around the workpiece rotation axis Rw parallel to the horizontal direction.

The tailstock 36 is arranged so as to face the headstock 20 in the Z-axis direction, and supports the other end of the workpiece 100 held by the headstock 20. The tailstock 36 is movable in the Z-axis direction so as to be brought into contact with or separated from the workpiece 100.

The tool post 30 holds the tool. The tool post 30 is movable in the Z axis; namely in the direction of a first axis A1 that is an axis parallel to the axis of the workpiece 100 held by the headstock 20. Further, the tool post 30 is configured to be able to advance and retract along a second axis A2 parallel to the X axis; in other words, in the direction of the second axis A2 parallel to the radial direction of the workpiece 100. As is apparent from the drawings, the second axis A2 (X axis) is inclined with respect to the horizontal direction, when seen from the front surface of the working chamber 12, so as to advance upward as it goes to the back side.

The turret 32 capable of holding multiple tools is provided on an end surface of the tool post 30 in the Z direction. The turret 32 has a polygonal shape when seen from the Z-axis direction, and is rotatable about an axis parallel to the Z axis. Multiple tool mount portions (not illustrated) on which tools can be mounted are provided on the peripheral surface of the turret 32. This arrangement enables an operator to select a tool to be used for machining by rotating the turret 32.

Further, an in-machine robot 40 is provided in the working chamber 12. The in-machine robot 40 performs various types of work inside and outside the in-machine robot 40. The in-machine robot 40 is an articulated robot having multiple links connected by joints. More specifically, the in-machine robot 40 has a root joint 42 fixed in the working chamber 12, a first link 50 connected to the root joint 42, a second link 52 connected to the first link 50 via a second joint 44, a third link 54 connected to the second link 52 via a third joint 46, and an end effector 56 connected to the third link 54 via a fourth joint 48. In the following description, a portion extending from the second link 52 positioned on the distal end side of the root joint 42 to the end effector 56 is referred to as a link unit 58.

Figure 3:
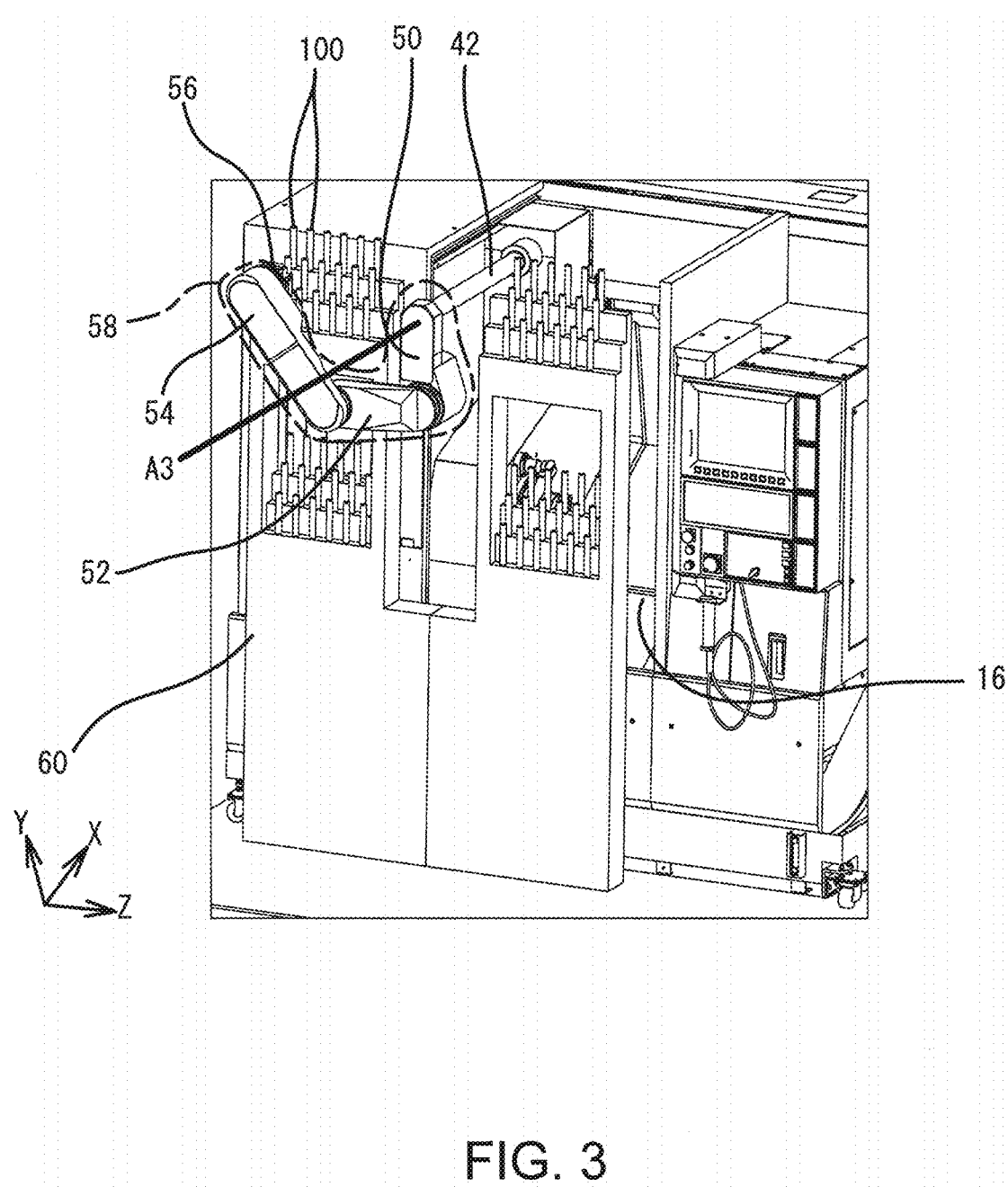
FIG. 3 is a perspective diagram illustrating a workpiece exchange operation performed by an in-machine robot.

The root joint 42 is fixed to a surface facing the opening 16, of wall surfaces of the working chamber 12. The root joint 42 is a linear-motion joint that is extendable in a specific direction. In this example, the root joint 42 extends and contracts in a direction parallel to the horizontal direction and orthogonal to the workpiece rotation axis Rw. In the following description, the axis of the root joint 42 in the extension/contraction direction is referred to as a third axis A3. In a state where the root joint 42 is most contracted, the terminal end of the root joint 42 is positioned in the working chamber 12, and also the entire link unit 58 is positioned in the working chamber 12. On the other hand, in a state where the root joint 42 is extended to the maximum, the terminal end of the root joint 42 is positioned on the outside of the working chamber 12, and also the entire link unit 58 is positioned on the outside of the working chamber 12. FIG. 3 is a perspective diagram illustrating an exemplary state where the root joint 42 is extended and the link unit 58 is positioned on the outside of the working chamber 12.

Each of the second to fourth joints 44, 46, and 48 is a rotary joint that is rotatable around an axis parallel to the third axis A3. Configuring the second to fourth joints 44, 46, and 48 as rotary joints rotatable around axes parallel to each other can simplify the position calculation of the end effector 56. That is, in such a configuration, the end effector 56 moves only in a plane orthogonal to the third axis A3. The position of the orthogonal plane in the third axis A3 direction can be easily calculated from the amount of extension of the root joint 42. Further, since the position calculation of the end effector 56 in the orthogonal plane is two-dimensional position calculation, the amount of calculation can be reduced compared to the case of three-dimensional position calculation.

The end effector 56 is not particularly limited to a specific form, as long as it can access an object and exert some action. The end effector 56 can be installed on any position of the in-machine robot 40, as long as it is displaceable according to the driving of the joints. However, in order to avoid interference with other members when accessing the object, the end effector 56 may be attached to a tip of the in-machine robot 40 (a tip of the third link 54).

Further, the end effector 56 may be non-detachably attached to the in-machine robot 40. Alternatively, in order to improve the versatility of the in-machine robot 40, the end effector 56 may be detachably attached to the in-machine robot 40. Accordingly, a tool changer capable of detachably holding the end effector 56 may be provided at a part of the in-machine robot 40 (at the tip of the third link 54, in the illustrated example). Further, the number of end effectors to be attached to the in-machine robot 40 is not limited to only one and may be two or more.

Further, as mentioned above, the end effector 56 is not particularly limited to a specific form, as long as it exerts some action. Accordingly, the end effector 56 may be a holding device for holding an object, for example. The form of holding by the holding device may be a hand-operation type that grips an object with a pair of members, or another type that sucks and holds an object, or may be a different type that uses a magnetic force for the holding. In the illustrated example in FIG. 1 and FIG. 2, the end effector 56 is a gripper capable of sandwiching the workpiece 100 with a pair of arms.

Further, as another form, the end effector 56 may be a sensor capable of sensing information about an object or the environment surrounding the object, for example. Examples of the sensor include a tactile sensor capable of detecting the presence of any contact with an object, a distance sensor capable of detecting the distance to an object, a vibration sensor capable of detecting vibrations of an object, a pressure sensor capable of detecting the pressure applied from an object, and a temperature sensor capable of detecting the temperature of an object. Detection results obtainable from these sensors are stored in association with positional information of the end effector 56, which can be calculated from the driving amounts of the joints, and are analyzed. For example, when the end effector 56 is a tactile sensor, a controller 59 analyzes the position, shape, and movement of an object based on the timing of detecting the contact to the object and positional information at that time.

Further, as another form, the end effector 56 may be a pressing mechanism for pressing an object, for example. Specifically, for example, the end effector 56 may be a roller or the like that is pressed against the workpiece 100 to suppress vibrations of the workpiece 100. Further, as another form, the end effector 56 may be a device capable of outputting a fluid for assisting the machining Specifically, the end effector 56 may be a device that discharges air for blowing off swarf or cooling fluid (cutting oil, cutting water, or the like) for cooling the tool or the workpiece 100. Further, the end effector 56 may be a device that releases energy or material for shaping of the workpiece. Accordingly, the end effector 56 may be a device that emits a laser or arc, for example, or a device that bleeds a material for laminate shaping. Further, as another form, the end effector 56 may be a camera that captures an image of an object. In this case, the image obtained by the camera may be displayed on an operation panel or the like.

Here, the end effector 56 is connected to the third link 54 via the fourth joint 48 being a rotary joint. Therefore, the posture of the end effector 56 can be appropriately changed. Accordingly, for example, when the end effector 56 is a gripper for holding the workpiece 100, the posture of the workpiece 100 held by the end effector 56 can be changed between a landscape posture in which the axial direction of the workpiece 100 is horizontal and a portrait posture in which the axial direction of the workpiece 100 is vertical.

The machine tool 10 is equipped with the controller 59. The controller 59 controls the driving of each portion of the machine tool 10 in response to an instruction from an operator. The controller 59 is configured by a processor that executes various operations and a memory that stores various control programs and control parameters, for example. Further, the controller 59 has a communication function for transmitting and receiving various data, such as NC program data, to and from other devices. The controller 59 may include, for example, a numerical control device that occasionally calculates the position of a tool or the workpiece 100. Further, the controller 59 may be a single device or may be configured as a combination of multiple arithmetic units.

Next, an exemplary movement of the in-machine robot 40 of the machine tool 10 will be described. As described above, the in-machine robot 40 includes the root joint 42 that is the linear-motion joint extendable between a state where the terminal end thereof is positioned inside the working chamber 12 and a state where the terminal end thereof is on the outside of the working chamber 12. Such a configuration enables the in-machine robot 40 to carry out various types of work both inside and outside the working chamber 12. For example, when the end effector 56 is a gripper capable of holding a workpiece, the in-machine robot 40 can perform work for exchanging workpieces.

When the in-machine robot 40 is used to exchange workpieces, a workpiece stocker 60 is located outside the machine tool 10 and near the opening 16, as illustrated in FIG. 3. The workpiece stocker 60 is not particularly limited in its configuration, as long as multiple columnar workpieces 100 can be accommodated. Accordingly, the workpiece stocker 60 may be an ordinary table on which the columnar workpieces 100 can be placed in landscape posture. However, in the case of landscape posture, the columnar workpieces 100 are unstable and the mounted workpieces 100 are likely to roll. Further, in the case of landscape posture, since the planar space occupied by each workpiece 100 tends to be larger, the number of the workpieces 100 mountable in a predetermined area is smaller. Therefore, the workpiece stocker 60 may have a configuration in which the columnar workpieces 100 are mounted in portrait posture, as illustrated in FIG. 3. Specifically, the workpiece stocker 60 illustrated in FIG. 3 has multiple mounting surfaces formed in a stepped shape. On each mounting surface, multiple support holes into which lower ends of respective columnar workpieces 100 are inserted are formed. The workpiece stocker 60 is suitable for mounting the workpieces 100 each being smaller in diameter and longer in axis, which are difficult to stand on their own in the portrait posture.

Figure 4:
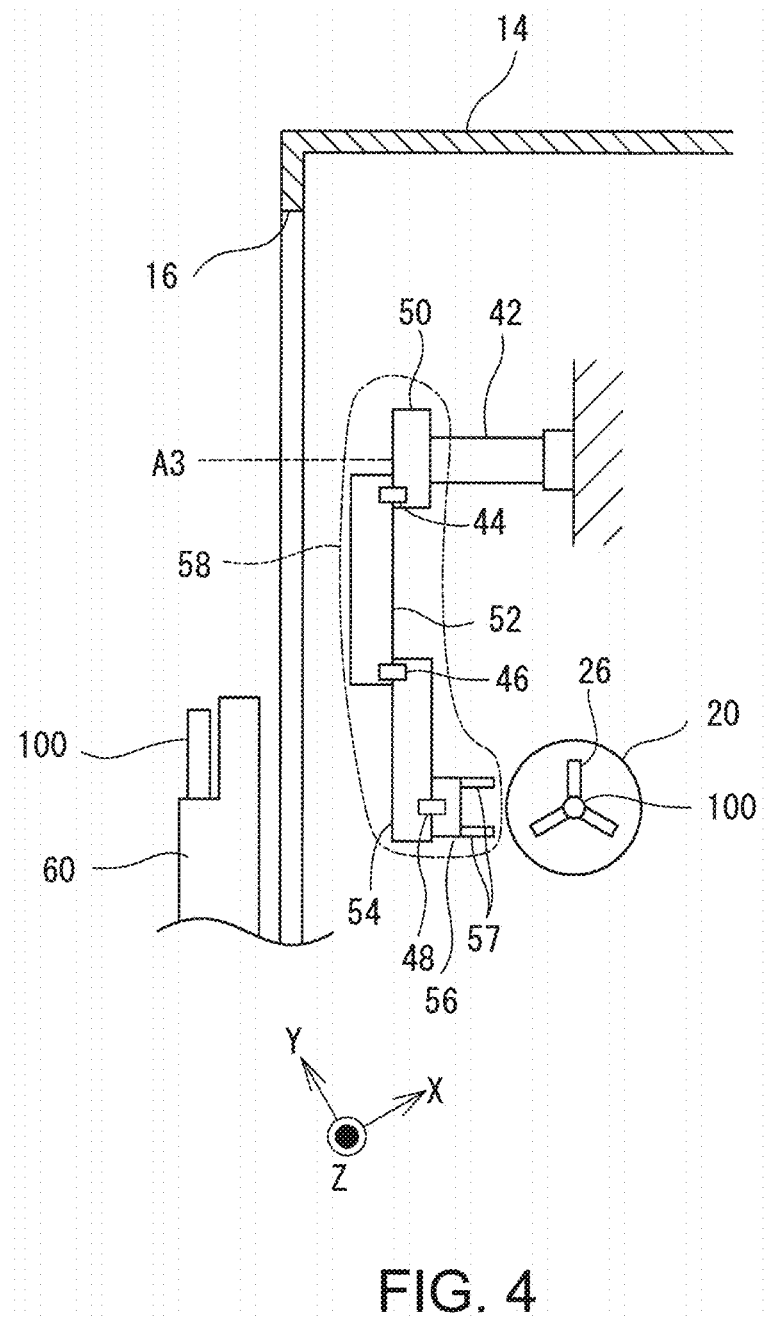
FIG. 4 is a schematic diagram illustrating a workpiece exchange operation performed by the in-machine robot.

FIG. 4 to FIG. 7 are schematic diagrams illustrating exemplary motions of the in-machine robot 40 when mounting the machined workpiece 100 held by the headstock 20 on the workpiece stocker 60. When mounting the machined workpiece 100 held by the headstock 20 on the workpiece stocker 60, the controller 59 drives the root joint 42 as well as the second and third joints 44 and 46 so that the end effector 56 is positioned on the opening 16 side of the workpiece 100 in the third axis A3 direction, as illustrated in FIG. 4. Further, the controller 59 drives the fourth joint 48 so that two arms 57 being paired and configuring the gripper are arrayed in the vertical direction.

Figure 5:
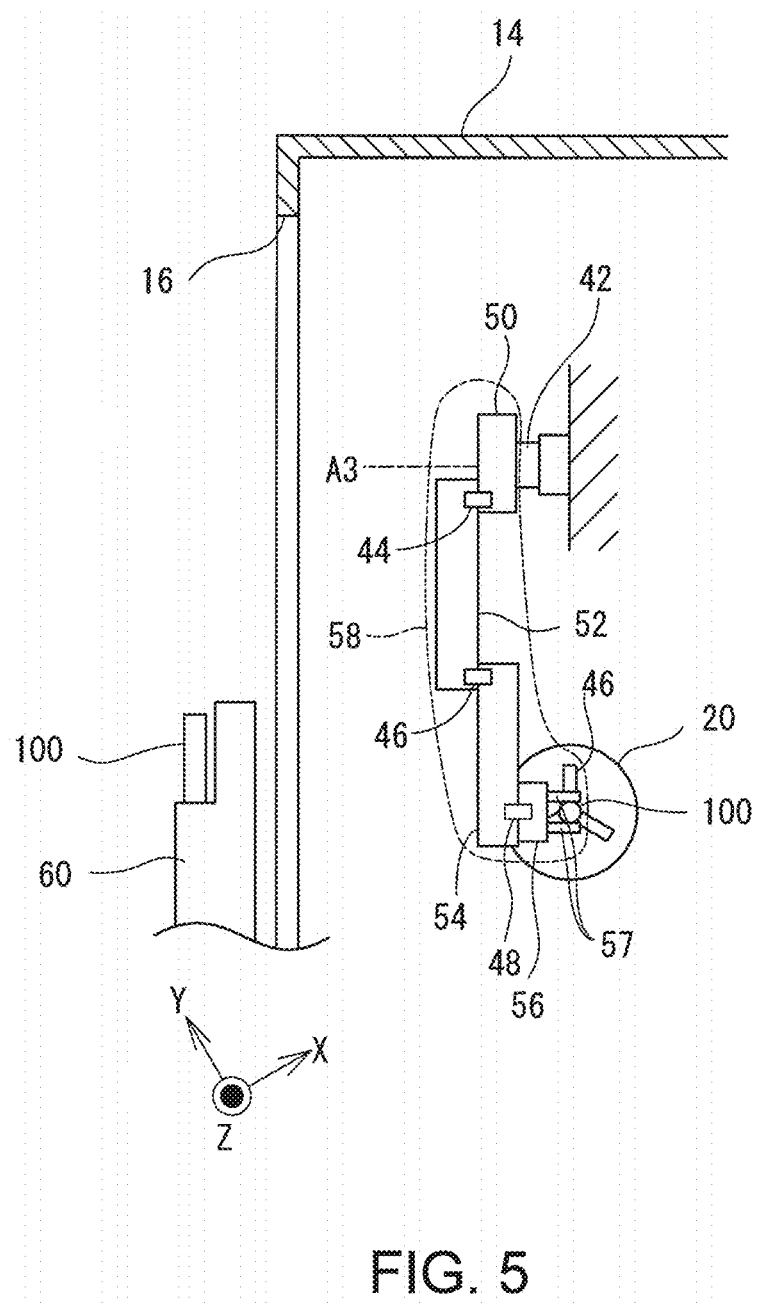
FIG. 5 is a schematic diagram illustrating a workpiece exchange operation performed by the in-machine robot.

When coming into a state illustrated in FIG. 5, the controller 59 subsequently contracts the root joint 42 until the arms 57 are positioned on both the upper and lower sides of the workpiece 100, and moves the end effector 56 to the back side in the third axis A3 direction. Subsequently, the controller 59 narrows the gap between the arms 57 to sandwich the workpiece 100 with the pair of arms 57, as illustrated in FIG. 5. Further, the controller 59 releases the chuck 26. When coming into this state, the controller 59 drives the in-machine robot 40 to convey the workpiece 100 to a position where it does not interfere with the chuck 26 and the headstock 20.

Figure 6:
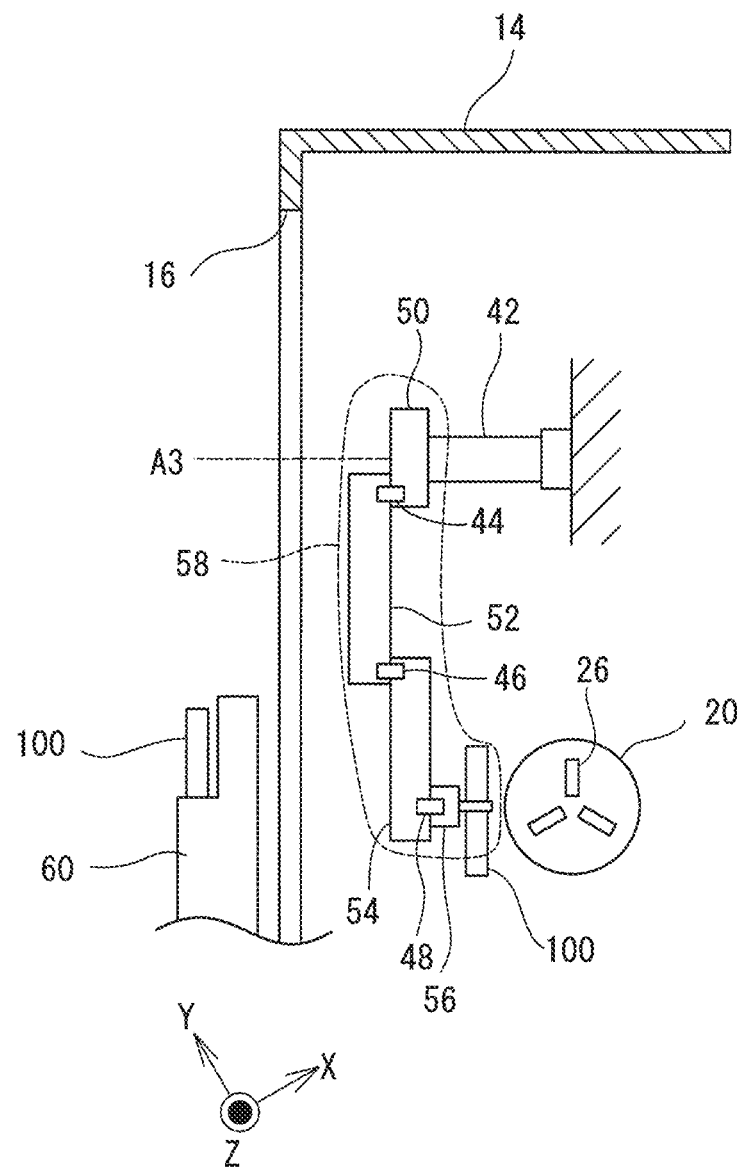
FIG. 6 is a schematic diagram illustrating a workpiece exchange operation performed by the in-machine robot.
Figure 7:
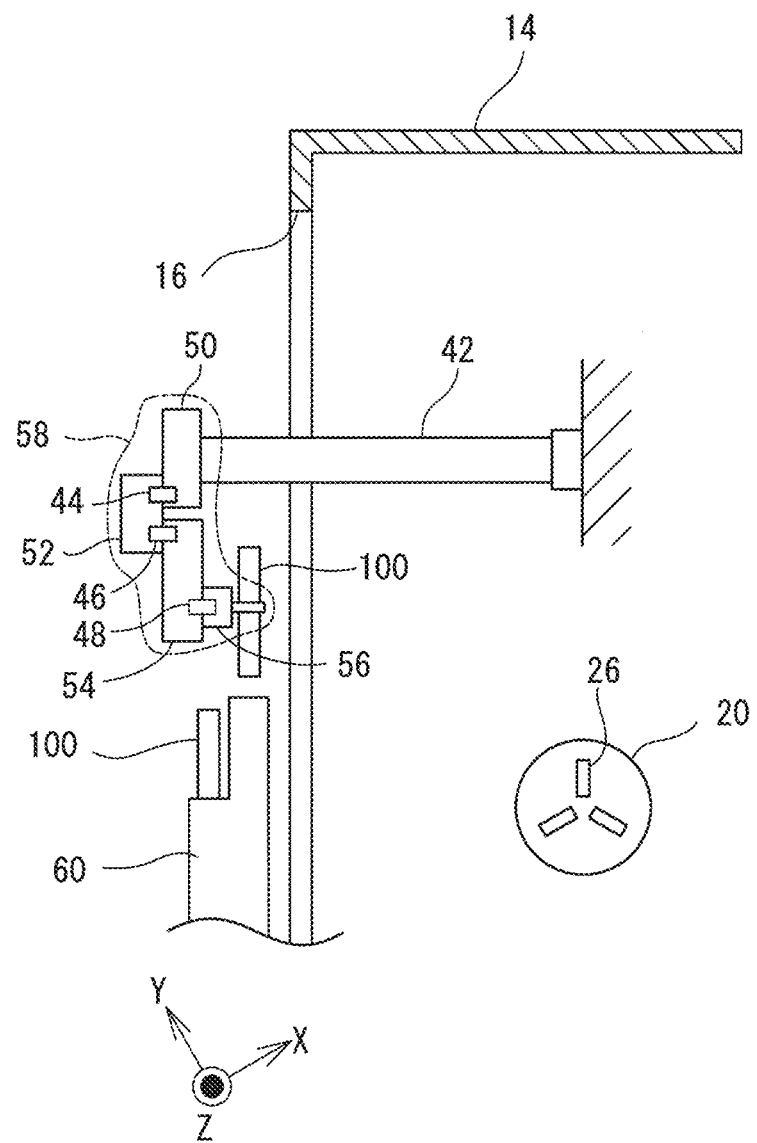
FIG. 7 is a schematic diagram illustrating a workpiece exchange operation performed by the in-machine robot.

Next, the controller 59 rotates the fourth joint 48 by 90 degrees, as illustrated in FIG. 6. As a result, the posture of the workpiece 100 held by the end effector 56 changes from the landscape posture to the portrait posture. Subsequently, the controller 59 causes the root joint 42 to extend until the entire link unit 58 is positioned on the outside of the working chamber 12, as illustrated in FIG. 7. Subsequently, the controller 59 drives the second joint 44 and the third joint 46 so as to insert the workpiece 100 into a support hole of the workpiece stocker 60. The work for conveying the machined workpiece 100 completes through the above operations. In the case of conveying another workpiece 100, which is to be machined, from the position on the workpiece stocker 60 to the headstock 20, the above-described procedure is reversed.

As mentioned above, in this example, since the link unit 58 is movable from the inside of the working chamber 12 to the outside or vice versa, the workpiece 100 can be easily conveyed as intended inside and outside the working chamber 12. Further, in this example, the posture of each workpiece held by the end effector 56 can be changed from the landscape posture to the portrait posture. This means that installation of a complicated mechanism on the workpiece stocker 60 side is not required, in mounting the workpiece 100 in the portrait posture.

Figure 8:
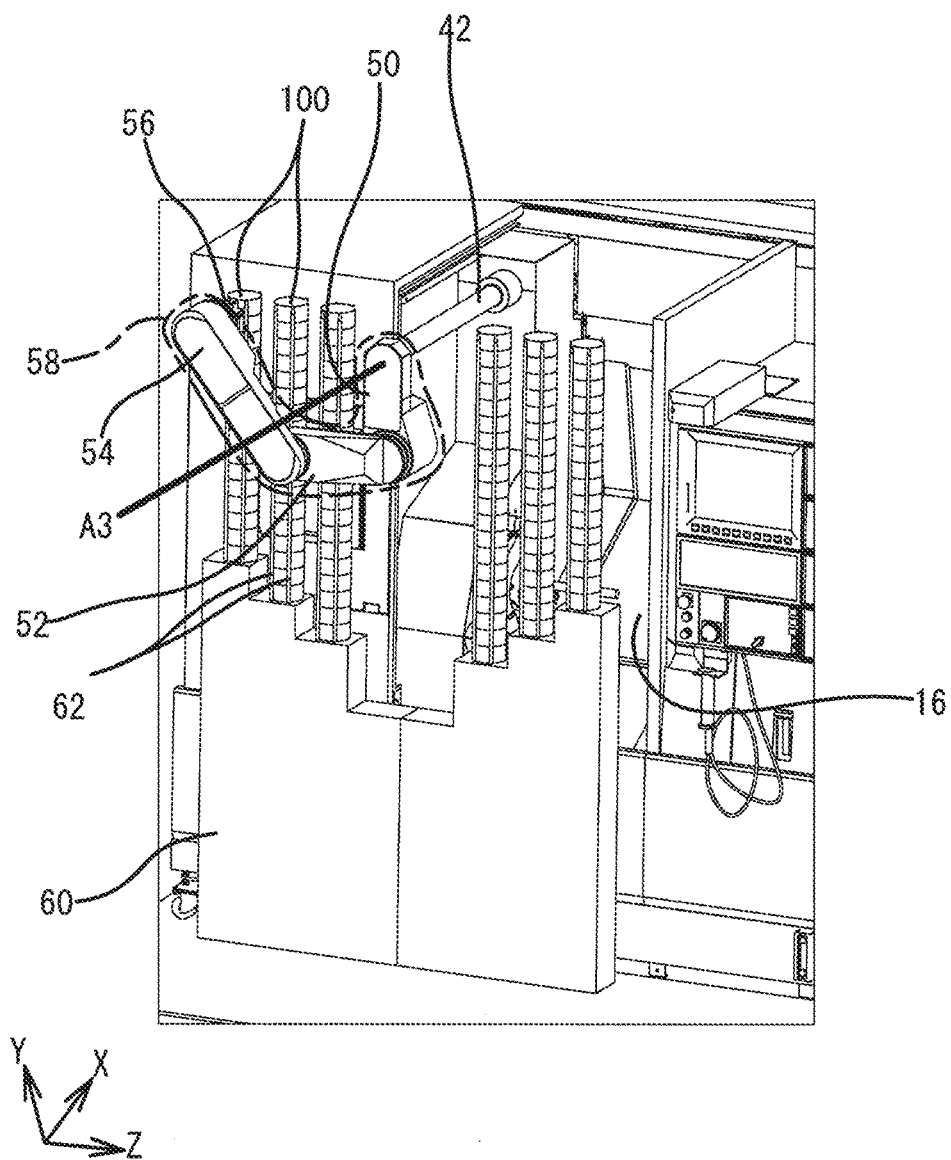
FIG. 8 is a perspective diagram illustrating a workpiece exchange operation performed by the in-machine robot.

The form of the workpiece stocker 60 may be appropriately changed depending on the shape of the workpiece 100 to be handled, the orientation of the end effector 56, and the like. For example, there may be some workpieces 100 that can stand on their own even in the portrait posture because of largeness in diameter and shortness in axis. In this case, multiple workpieces 100 may be stacked in the axial direction thereof, as illustrated in FIG. 8. Further, in order to prevent the stacked workpieces 100 from falling, the workpiece stocker 60 may be provided with multiple poles 62 surrounding the circumference of the stacked workpieces 100.

Figure 9:
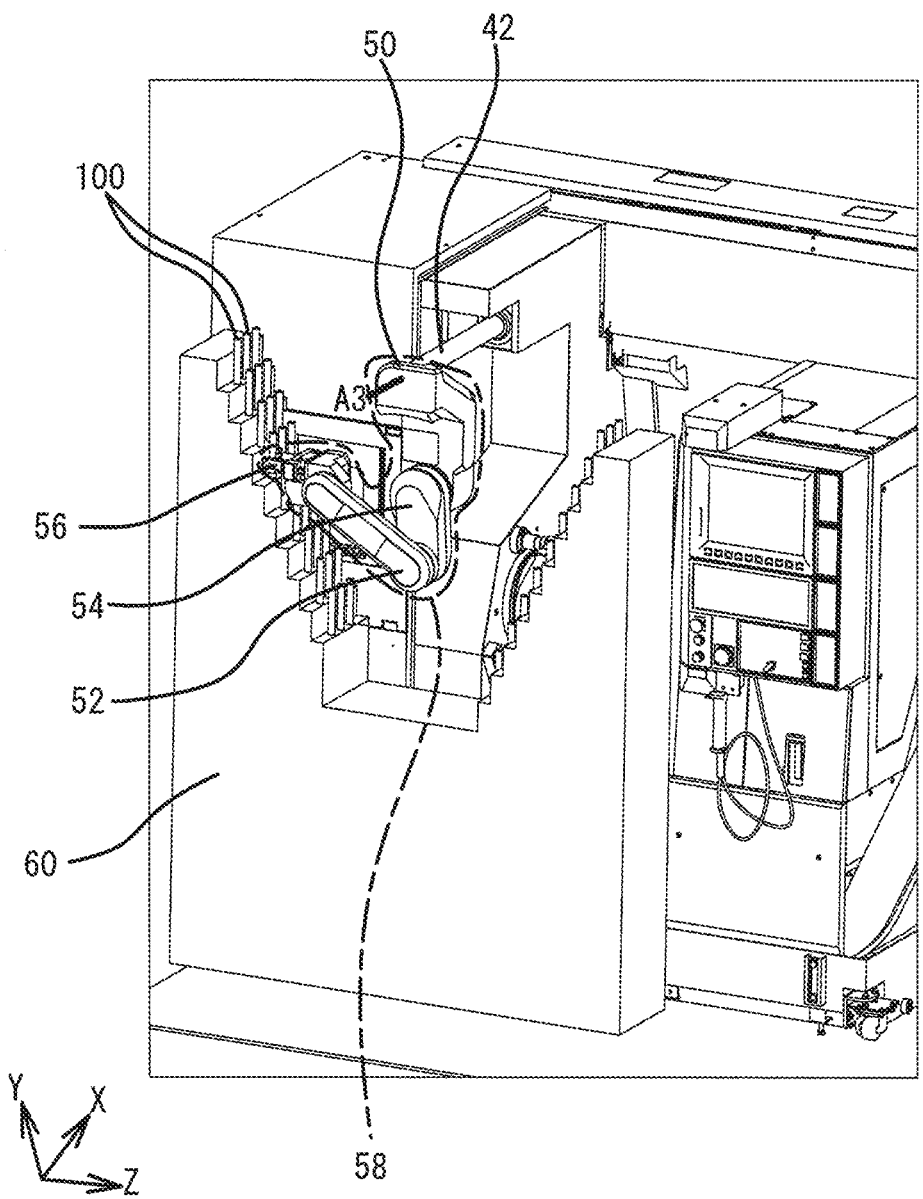
FIG. 9 is a perspective diagram illustrating a workpiece exchange operation performed by the in-machine robot.
Figure 10:
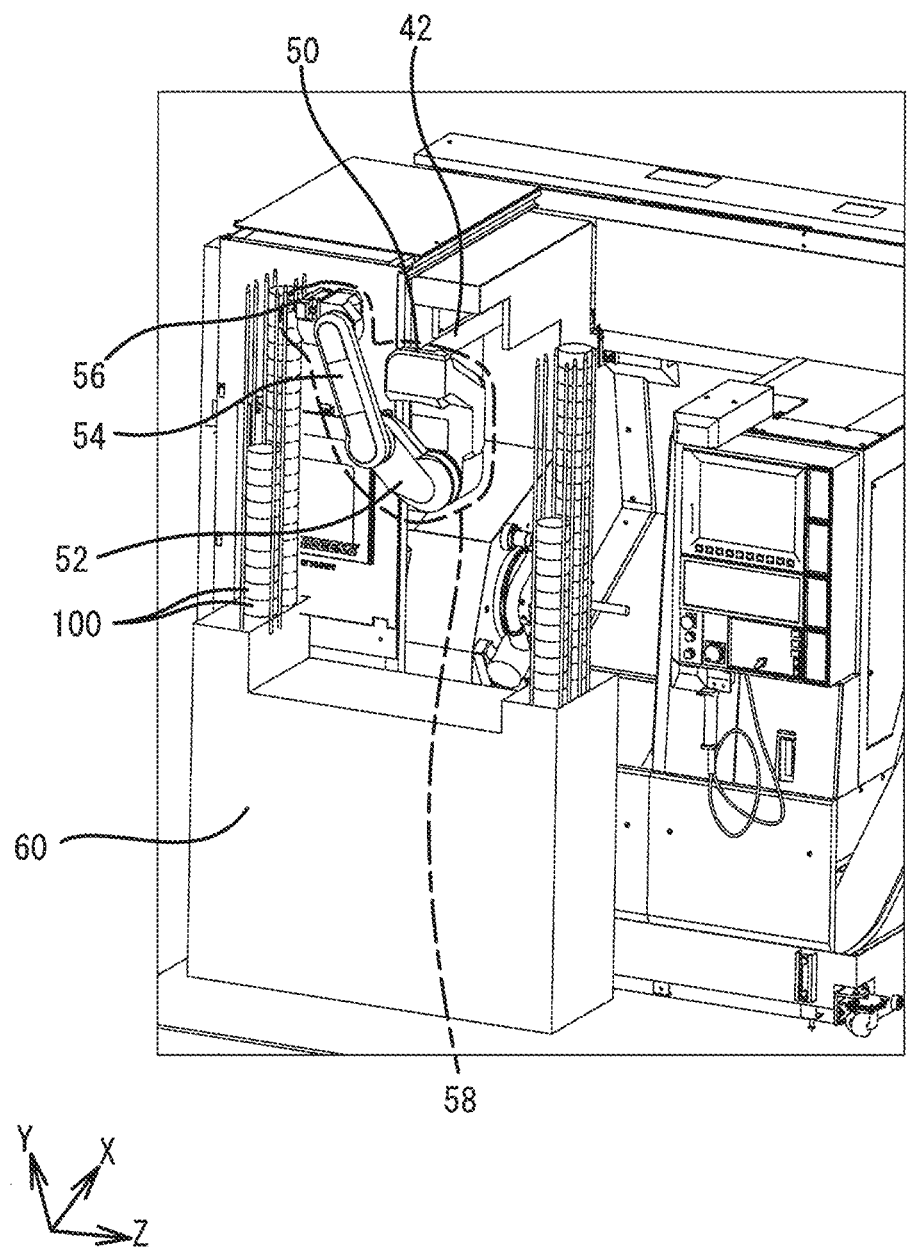
FIG. 10 is a perspective diagram illustrating a workpiece exchange operation performed by the in-machine robot.

Further, according to the above description, the arms 57 of the end effector 56 are attached to the third link 54 in the posture in which the arms 57 are parallel to the third axis A3, and the stepped surfaces of the workpiece stocker 60 are aligned in a direction parallel to the third axis A3. However, the mounting orientation of the end effector 56 may be changed appropriately. For example, as illustrated in FIG. 9, the end effector 56 may be attached to the third link 54 in a posture in which the orientation of its arms is orthogonal to the third axis A3. In this case, the stepped surfaces of the workpiece stocker 60 may be aligned in a direction orthogonal to the third axis A3; that is, in a direction parallel to the arm axial direction. Further, as illustrated in FIG. 10, the workpiece stocker 60 may have no stepped surface. Further, according to the above description, respective workpieces are mounted in the portrait posture, but they may be mounted in the landscape posture or an oblique posture.

Figure 11:
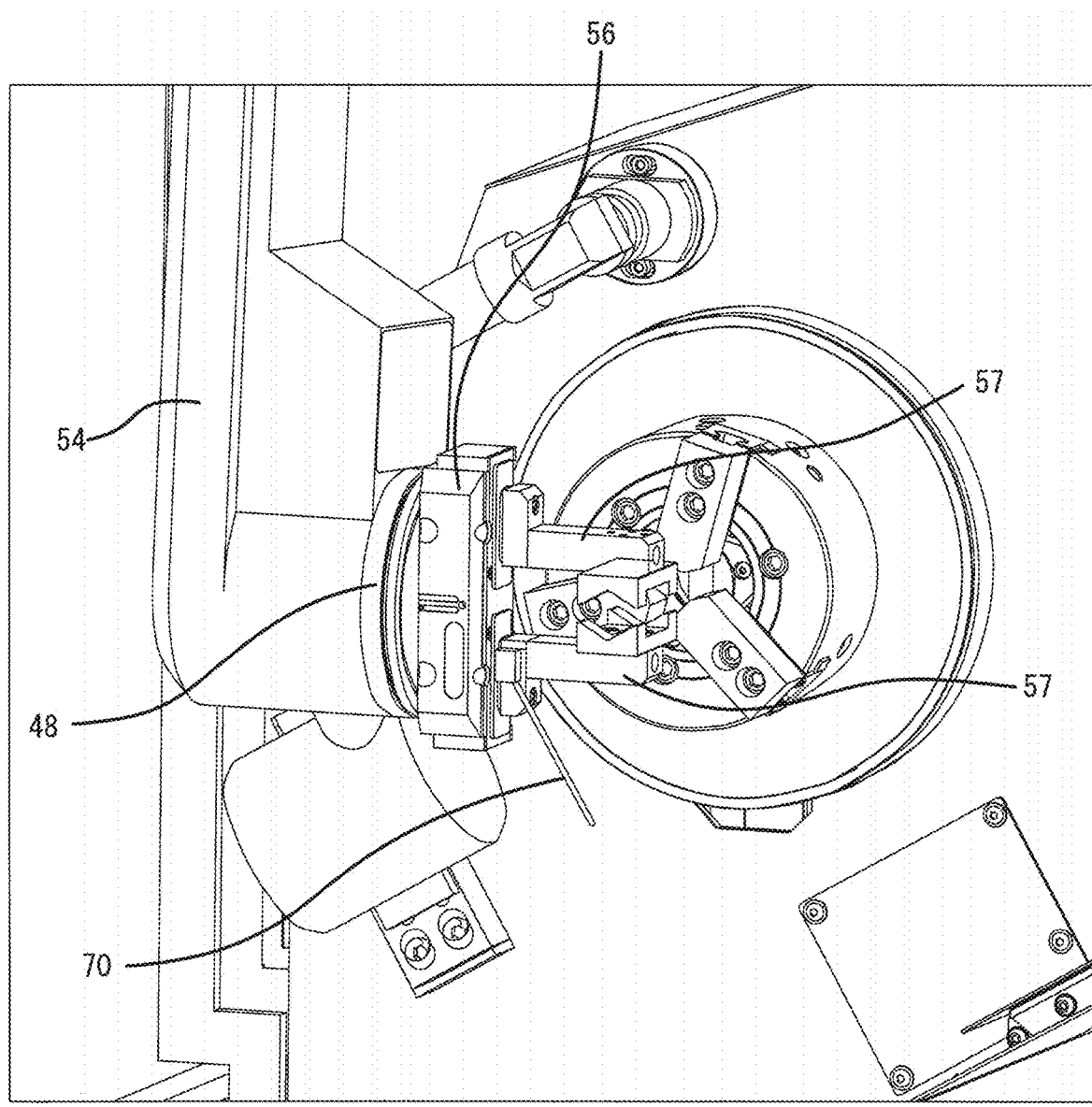
FIG. 11 is an enlarged perspective diagram illustrating the periphery of an end effector.

Further, the in-machine robot 40 can be used for not only work to be performed in an area straddling the inside and outside of the working chamber 12 but also work to be completed inside the working chamber 12. For example, as illustrated in FIG. 11, it may be conceivable to provide a cutting water nozzle, as an additional end effector 70, beside the gripper. In this case, by appropriately changing the posture of the in-machine robot 40, cutting water can be sprayed to various places inside the working chamber 12.

Here, as is apparent from the foregoing description, the entire in-machine robot 40 fits inside the working chamber 12 depending on the extension/contraction amount of the root joint 42. Therefore, even in a period during which the workpiece 100 is machined; that is, when the door 18 is closed, the in-machine robot 40 can stay inside the working chamber 12. Therefore, the in-machine robot 40 can be used for a machining assist work to be performed by the headstock 20 and the tool post 30, or a machining-related information acquisition work, or the like. For example, during lathe turning, a long series of flow-type swarf may be generated and the swarf may twine around the workpiece or the like. In this case, the cutting water nozzle attached to the in-machine robot 40 may be used to spray cutting water aiming at a machining point; that is, a tip of the tool. Adopting such a configuration can suppress the movement of swarf and prevent twining. Although the position of the machining point gradually changes according to the progress of machining, driving the four joints 42 to 48 can cause the end effectors 56 and 70 attached to the in-machine robot 40 to be three-dimensionally displaceable so as to follow the movement of the machining point.

Further, instead of or in addition to the gripper, a roller or the like may be provided as the end effector 56, so that the roller or the like is in contact with the workpiece 100 during lathe turning. Such a configuration can suppress chatter vibrations of the workpiece 100. Further, instead of or in addition to the gripper, a temperature sensor may be provided as the end effector 56 to measure the temperature of the workpiece 100 during the lathe turning.

Figure 12:
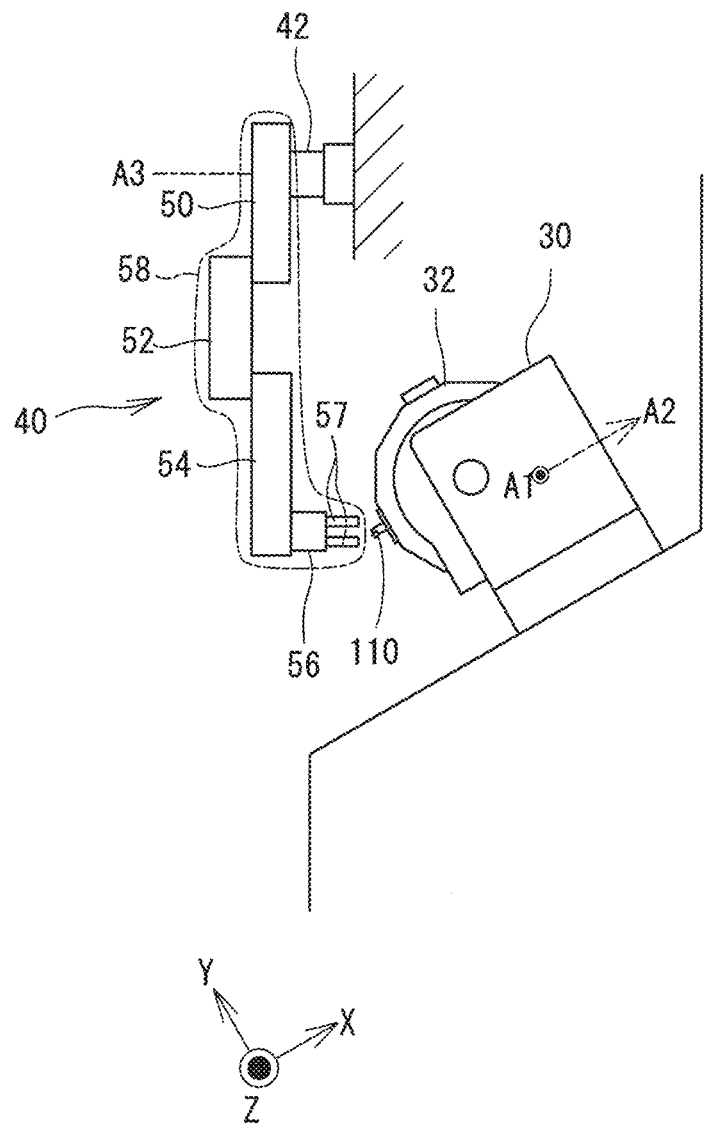
FIG. 12 is a diagram illustrating one example of the movement of the in-machine robot whose third axis is horizontal.
Figure 13:
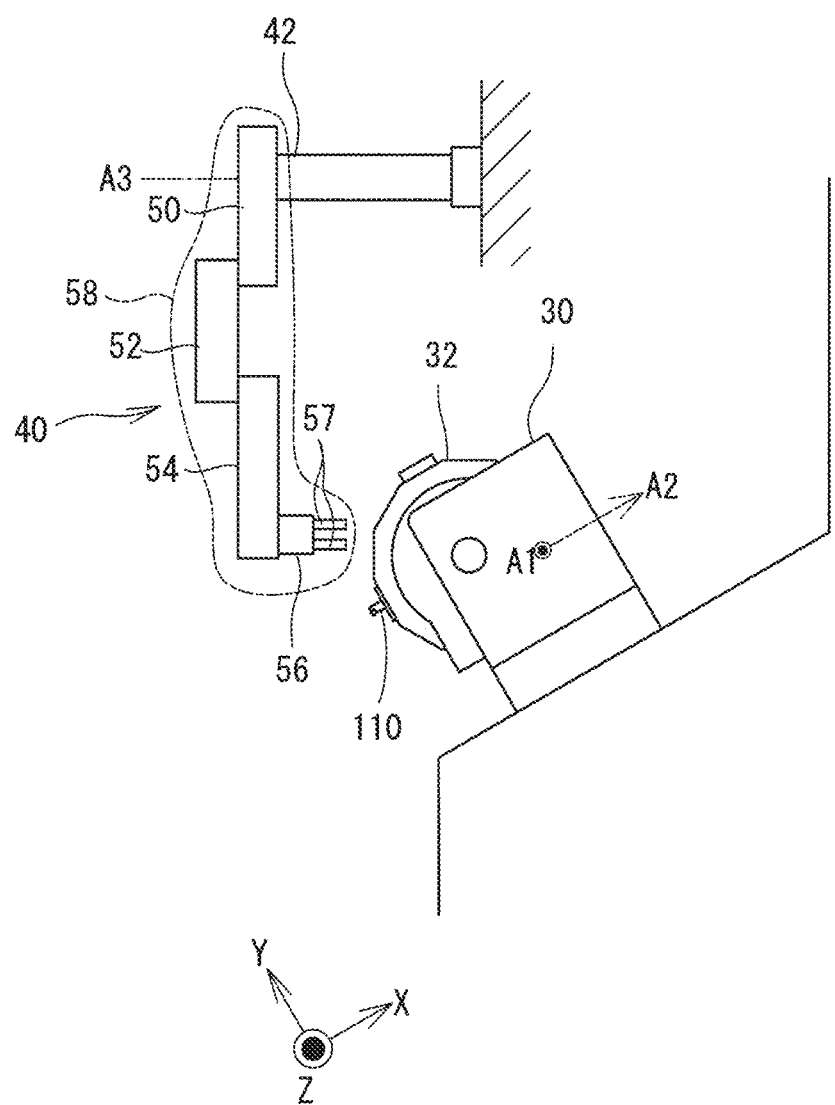
FIG. 13 is a diagram illustrating one example of the movement of the in-machine robot whose third axis is horizontal.

In the above description, the extension/contraction direction of the root joint 42, which is the third axis A3, is not parallel to the second axis A2 being the moving direction of the tool post 30. However, the third axis A3 may be set to be parallel to the second axis A2. Such a configuration can downsize the in-machine robot 40 and can cause the end effector 56 to easily follow the tool. This will be described in more detail with reference to FIG. 12 to FIG. 15. FIG. 12 to FIG. 15 are schematic side views illustrating the tool post 30 and the in-machine robot 40. As described above, each of the second axis A2 and the third axis A3 is the direction orthogonal to the workpiece rotation axis Rw. Here, it is now assumed that the second axis A2 is inclined so as to advance downward as it approaches the opening 16 and the third axis A3 is parallel to the horizontal direction, as illustrated in FIG. 12 and FIG. 13. In this case, when the posture of the link unit 58 is constant, the distance between the end effector 56 and the tool increases as the tool post 30 advances toward the negative side of the Z axis. Therefore, in order to hold the end effector 56 in the vicinity of the tool, it is necessary to change the posture of the link unit 58 in parallel with the extension of the root joint 42 so as to cause the end effector 56 to move downward. The above control is complicated and causes an increase in the amount of calculation.

Further, even when the tool post 30 reaches the end on the negative side in the X direction, in order to position the end effector 56 in the vicinity of the tool, respective links 50, 52, and 54 need to be sufficiently long, and the entire in-machine robot 40 tends to be large.

Figure 14:
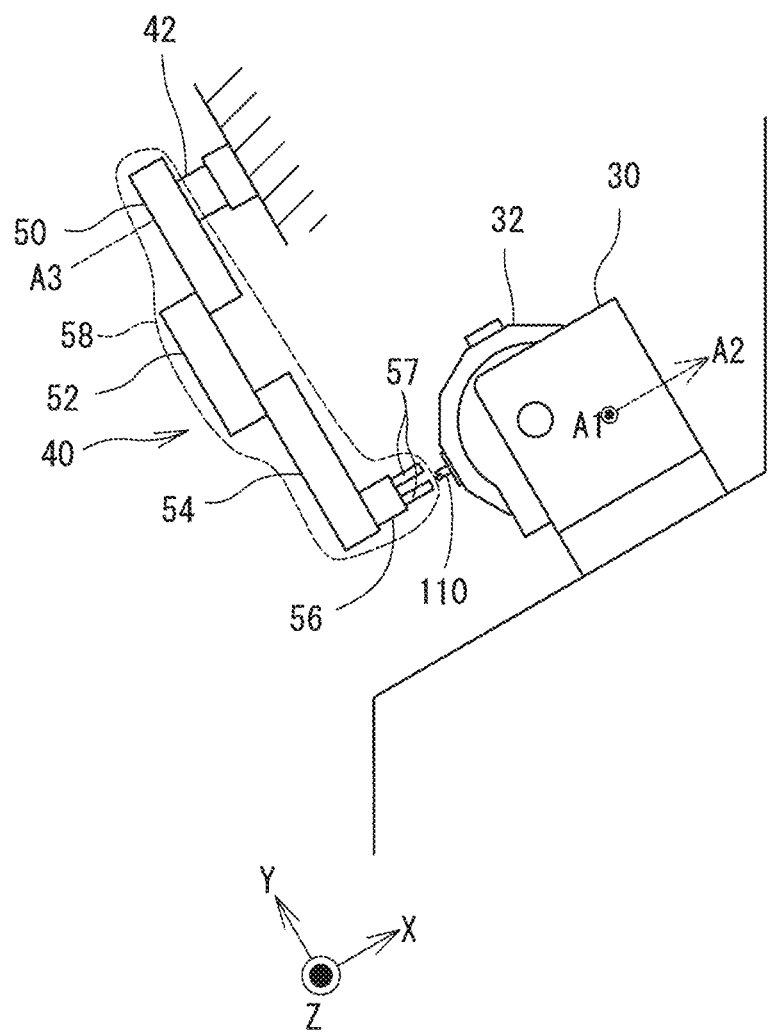
FIG. 14 is a diagram illustrating one example of the movement of the in-machine robot whose third axis is inclined.
Figure 15:
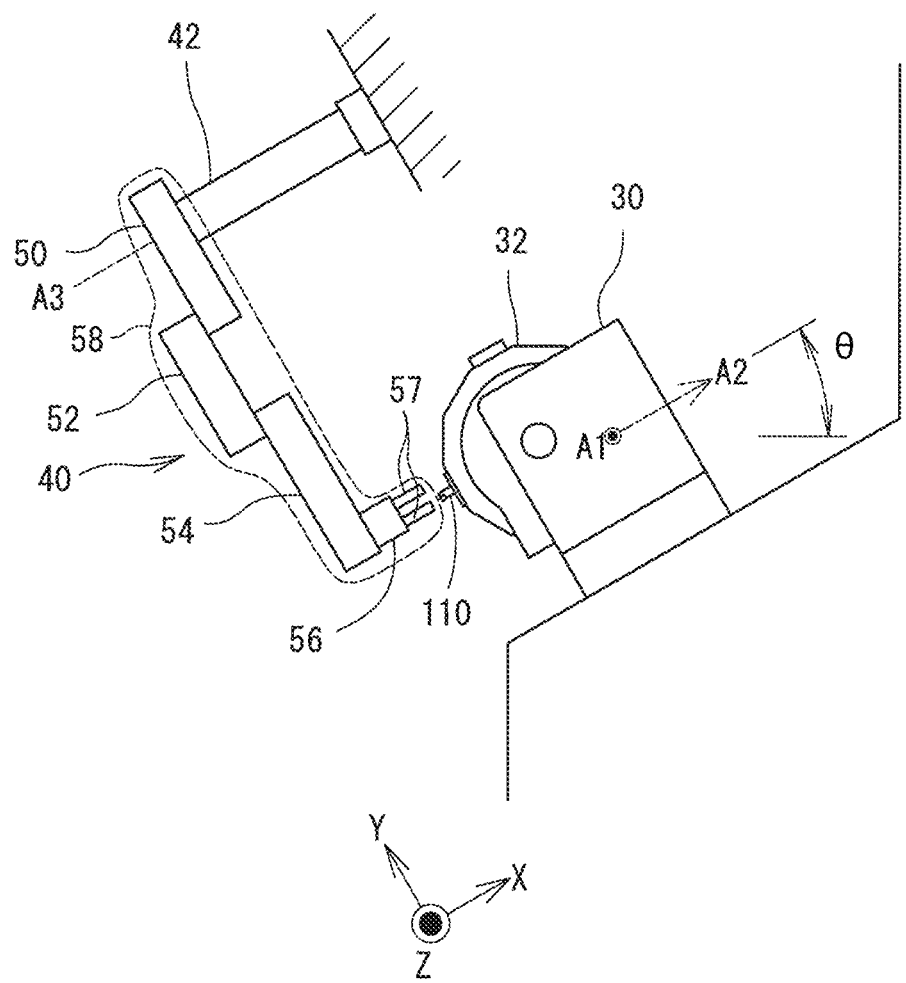
FIG. 15 is a diagram illustrating one example of the movement of the in-machine robot whose third axis is inclined.

On the other hand, as illustrated in FIG. 14 and FIG. 15, when the third axis A3 is inclined so as to be parallel to the second axis A2, causing the root joint 42 to extend in conjunction with the movement of the tool post 30 along the second axis A2 can hold the end effector 56 in the vicinity of the tool. As a result, the end effector 56 can be caused to easily follow the tool. Further, even when the tool post 30 reaches the end on the negative side in the X direction, the distance between the in-machine robot 40 and the tool post 30 can be kept short. Therefore, respective links 50, 52, and 54 can be made relatively short, and the entire in-machine robot 40 can be downsized. The extension/contraction direction of the root joint 42, which is the third axis A3, does not need to be completely parallel to the second axis A2. For example, it is now assumed that θ represents the angle formed between the second axis A2 and a horizontal plane, as illustrated in FIG. 15. In this case, setting the angle formed between the third axis A3 and the second axis A2 to be less than θ/2 can downsize the entire in-machine robot 40, as compared to the case in which the third axis A3 is horizontal.

Further, the above-described configurations are mere examples and may be appropriately modified as long as they include, at least, the headstock 20 for holding the workpiece 100 so as to be rotatable around the horizontal axis, the tool post 30 for holding a tool, and the in-machine robot 40 provided in the working chamber 12, and further the in-machine robot 40 has the link unit 58 and the linear-motion joint (i.e., the root joint 42) that causes the link unit 58 to move to the inside and outside of the working chamber 12. Accordingly, the link unit 58 is not limited to the above-described configuration and may be appropriately modified. Further, the technique disclosed in the present specification may be applied to machine tools of other forms, so long as they include the headstock 20 for rotationally holding the workpiece 100 and the tool post 30 for holding a tool (not illustrated). For example, the technique disclosed in the present specification may be applied to a multi-tasking machine in which a lathe and a milling machine are combined, or may be applied to a cylindrical grinding machine.

REFERENCE SIGNS LIST 10 machine tool, 12 working chamber, 14 cover, 16 opening, 18 door, 20 headstock, 21 spindle end, 26 chuck, 30 tool post, 32 turret, 36 tailstock, 40 in-machine robot, 42 root joint, 44 second joint, 46 third joint, 48 fourth joint, 50 first link, 52 second link, 54 third link, 56 end effector, 57 arm, 58 link unit, 59 controller, 60 workpiece stocker, 62 pole, 70 additional end effector, 100 workpiece, 110 tool, A1 first axis, A2 second axis, A3 third axis, Rw workpiece rotation axis

The invention claimed is:
1. A machine tool comprising:
a headstock that is arranged in a working chamber and holds a workpiece so as to be rotatable around a workpiece rotation axis parallel to a horizontal direction;
a tool post that is arranged in the working chamber in such a way as to be movable in a first axial direction parallel to the workpiece rotation axis and in a second axial direction orthogonal to the first axial direction, and holds a tool;
a robot that is arranged in the working chamber;
a cover that surrounds the working chamber;
an opening of the cover for communicating an inside and an outside of the working chamber; and
a door that opens and closes the opening,
wherein the robot includes a root joint fixed in the working chamber, said root joint having a longitudinal axis extending in a direction orthogonal to the workpiece rotation axis and a link unit positioned on a distal end side of the root joint, said link unit having multiple links that are articulated with each other, and
the root joint is a linear-motion joint that is extendable along said longitudinal axis in the direction orthogonal to the workpiece rotation axis between a first length where the entire link unit is positioned inside of the working chamber defining a contraction direction and a second length where the entire link unit is positioned outside of the working chamber through the opening of the cover, defining an extension direction.
2. The machine tool according to claim 1, wherein
each of the multiple links is rotatable around an axis parallel to the extension direction and contraction direction of the root joint.
3. The machine tool according to claim 2, wherein
the link unit includes
a first link connected to the root joint,
a second link connected to the first link via a second joint,
a third link connected to the second link via a third joint, and
an end effector connected to the third link via a fourth joint,
wherein each of the second joint, the third joint, and the fourth joint is a rotary joint that rotates around an axis parallel to the extension direction and contraction direction of the root joint.
4. The machine tool according to any one of claim 1, wherein
the second axial direction is inclined at an angle θ with respect to a horizontal plane, so as to extend downward as it approaches the rotation axis, and
an angle formed between the extension direction and contraction direction of the root joint and the second axial direction is less than θ/2.
5. The machine tool according to claim 4, wherein
the extension direction and contraction direction of the root joint is a direction parallel to the second axial direction.
6. The machine tool according to claim 1, wherein the machine tool is a horizontal lathe.
7. The machine tool according to claim 1, wherein the machine tool is a cylindrical grinding machine.

* * * * *